United States Patent
Hajek

(10) Patent No.: US 10,822,273 B2
(45) Date of Patent: Nov. 3, 2020

(54) CURABLE CASTING COMPOUND FOR PRODUCING PLASTICS MOULDED PARTS AND USE THEREOF

(71) Applicant: BLANCO GmbH + Co KG, Oberderdingen (DE)

(72) Inventor: Andreas Hajek, Weingarten (DE)

(73) Assignee: BLANCO GmbH + Co KG, Oberderdingen (DE)

( * ) Notice: Subject to any disclaimer, the term of this patent is extended or adjusted under 35 U.S.C. 154(b) by 165 days.

(21) Appl. No.: 16/102,046

(22) Filed: Aug. 13, 2018

(65) Prior Publication Data

US 2018/0346379 A1 Dec. 6, 2018

Related U.S. Application Data

(63) Continuation of application No. PCT/EP2017/053164, filed on Feb. 13, 2017.

(30) Foreign Application Priority Data

Mar. 24, 2016 (DE) .................. 10 2016 105 525

(51) Int. Cl.

| | |
|---|---|
| *C04B 14/04* | (2006.01) |
| *C08K 9/06* | (2006.01) |
| *C04B 26/06* | (2006.01) |
| *C08L 33/12* | (2006.01) |
| *C04B 20/10* | (2006.01) |
| *C08F 265/06* | (2006.01) |
| *C08K 3/34* | (2006.01) |
| *C04B 14/06* | (2006.01) |
| *C04B 14/38* | (2006.01) |
| *C04B 26/10* | (2006.01) |
| *C04B 26/30* | (2006.01) |
| *C04B 111/52* | (2006.01) |
| *C04B 111/00* | (2006.01) |

(52) U.S. Cl.
CPC ............ *C04B 26/06* (2013.01); *C04B 14/043* (2013.01); *C04B 14/047* (2013.01); *C04B 14/06* (2013.01); *C04B 14/383* (2013.01); *C04B 20/1051* (2013.01); *C04B 26/10* (2013.01); *C04B 26/30* (2013.01); *C08F 265/06* (2013.01); *C08K 3/34* (2013.01); *C08K 9/06* (2013.01); *C08L 33/12* (2013.01); *C04B 2111/00439* (2013.01); *C04B 2111/00965* (2013.01); *C04B 2111/52* (2013.01); *C08K 2201/005* (2013.01); *C08K 2201/006* (2013.01); *C08K 2201/014* (2013.01)

(58) Field of Classification Search
CPC ..... C04B 26/06; C04B 14/043; C04B 14/047; C04B 14/06; C04B 20/1051; C04B 26/10; C04B 26/30; C04B 2111/00439; C04B 2111/00965; C04B 2201/005; C04B 2201/006; C08F 265/06; C08K 3/34; C08K 9/06; C08K 2201/014; C08L 33/12
See application file for complete search history.

(56) References Cited

U.S. PATENT DOCUMENTS

| | | | |
|---|---|---|---|
| 3,427,337 A | 2/1969 | Miller et al. | |
| 4,720,519 A | 1/1988 | Orywol et al. | |
| 4,826,901 A | 5/1989 | Ittmann et al. | |
| 4,868,239 A | 9/1989 | Bernhardt et al. | |
| 5,079,286 A | 1/1992 | Hanisch et al. | |
| 5,670,570 A | 9/1997 | Peeters et al. | |
| 6,071,542 A * | 6/2000 | Tanimoto | A01N 59/16 423/700 |
| 2007/0014952 A1 | 1/2007 | Delong et al. | |
| 2008/0211142 A1 | 9/2008 | Hollstein | |
| 2010/0084597 A1* | 4/2010 | Schwab | B01D 19/0404 252/8.86 |
| 2012/0149808 A1 | 6/2012 | Hajek et al. | |

FOREIGN PATENT DOCUMENTS

| | | |
|---|---|---|
| CH | 602846 | 8/1978 |
| DE | 1694574 | 3/1972 |
| DE | 3331371 | 4/1984 |
| DE | 3447114 | 4/1986 |
| DE | 19503713 | 8/1996 |
| DE | 10 2014 216 437 | 2/2016 |
| EP | 0193791 | 9/1986 |
| EP | 0214551 | 3/1987 |
| WO | 2005071000 | 8/2005 |
| WO | 2010142531 | 12/2010 |

OTHER PUBLICATIONS

International Searching Authority, International Search Report issued in connection with International Patent Application No. PCT/EP2017/053164, dated Apr. 10, 2017, 6 pages.

International Searching Authority, Written Opinion issued in connection with International Patent Application No. PCT/EP2017/053164, dated Apr. 10, 2017, 8 pages.

\* cited by examiner

*Primary Examiner* — Pegah Parvini

(74) *Attorney, Agent, or Firm* — Hanley, Flight and Zimmerman, LLC

(57) ABSTRACT

In one aspect, the disclosed examples relate to a curable casting compound for producing plastics moulded parts. For example, the curable casting compound may include a binder component on the basis of a polymerisable monomer and a proportion of approximately 40% to approximately 85% by weight of one or more inorganic fillers. In one example, the casting compound includes an aluminosilicate as one of the inorganic fillers. Other examples are provided.

18 Claims, No Drawings

CURABLE CASTING COMPOUND FOR PRODUCING PLASTICS MOULDED PARTS AND USE THEREOF

CROSS REFERENCE TO RELATED APPLICATIONS

This application is a continuation of prior Patent Cooperation Treaty Application PCT/EP2017/053164, filed Feb. 13, 2017, which claims priority to German patent application DE 10 2016 105 525.5, filed Mar. 24, 2016. Applications PCT/EP2017/053164 and DE 10 2016 105 525.5 are hereby incorporated by reference in their entireties.

TECHNICAL FIELD

The present invention relates to a casting compound for producing plastics moulded parts, comprising a binder component on the basis of a polymerisable monomer and a proportion of approximately 40 to approximately 85% by weight of one or more inorganic fillers.

The invention further relates to the use of such a casting compound for producing kitchen or sanitary articles, and also to the plastics moulded parts produced.

BACKGROUND

Such casting compounds are known from the prior art, for example from WO 2005/071000 A1. Due to the relatively high filler proportion of the casting compounds, plastics moulded parts can be produced which have the required mechanical properties for use in the kitchen and sanitary article field. In addition, through the selection of the filler or fillers, a visual structuring of the surface of the plastics moulded parts can be achieved, for example, a granite decoration surface.

DETAILED DESCRIPTION

It has been found that the thermal loading capacity of the previously known plastics moulded parts is not always satisfactory. Above all under the influence of dry heat or temperature changes, material damage can occur.

Examples disclosed herein propose a casting compound for producing plastics moulded parts with a high thermal resistance.

In one example, a casting compound comprises an aluminosilicate as one of the inorganic fillers.

It has surprisingly been found that through the partial or complete replacement of the conventionally used inorganic fillers (in particular quartz or other materials on the basis of $SiO_2$), the thermal loading capacity of the plastics moulded parts produced can be improved. This finds expression in that the occurrence of colorations, blister formation and microcracks under the influence of extreme heat or under temperature changes is reduced or entirely prevented. In practice, severe thermal stress occurs, for example, if hot pans are placed in a sink or on a worktop.

As a further advantage, the impact strength of the plastics moulded parts produced can also be improved through the addition of an aluminosilicate as a filler.

According to the examples herein, the proportion of aluminosilicate in the casting compound is preferably from approximately 3% to approximately 85% by weight, more preferably from approximately 10% to approximately 60% by weight. It has been found that even a relatively small proportion of aluminosilicate leads to an improvement of the thermal properties, wherein with an increase in the proportion, the improvements are all the more marked. The aluminosilicate can either represent the sole inorganic filler in the casting compound or can be present in combination with other inorganic fillers.

The aluminosilicate preferably has a stoichiometric composition in which the total of the proportions of $Al_2O_3$ and $SiO_2$ is approximately 98% or more. Further elements, for example, calcium, magnesium or titanium are thus contained in the aluminosilicate only in a minor proportion, for example as an impurity.

Further preferably, the aluminosilicate has a stoichiometric composition which corresponds to a proportion of approximately 50% to approximately 99% by weight of $Al_2O_3$ and a proportion of approximately 1% to approximately 50% by weight of $SiO_2$. This also includes, in particular, an aluminosilicate with the formula $Al_2SiO_5$, that is an equimolar proportion of $Al_2O_3$ and $SiO_2$.

The aluminosilicate preferably has a mean particle size (D50-value) in the range of approximately 5 μm to approximately 40 μm. As narrow a particle size distribution about the respective mean value as possible is favourable.

It is particularly advantageous if the aluminosilicate is present in the form of particles that are coated with a reactive component. The type of reactive component herein corresponds to the polymerisable monomer of the binder component, so that in this way an optimum binding of the filler particles to the polymer matrix is achieved. For the production of plastics moulded parts on the basis of polymethylacrylate (PMA) or polymethylmethacrylate (PMMA), the particles are coated, in particular, with a methacrylsilane.

The aluminosilicate preferably has a specific surface area (BET value) from approximately 0.2 $m^2/g$ to approximately 3 $m^2/g$.

For the binder component, in the context of the invention, different types of monomers can be used wherein methylacrylate or methylmethacrylate, which lead after curing to moulded bodies on the basis of acrylic resin, are particularly preferred. Alternatively, the casting compound can comprise an epoxide, an unsaturated dicarboxylic acid or its anhydride or a diisocyanate as a monomer, in order, in combination with a further monomer with corresponding functionalisation (aliphatic or aromatic amines, anhydrides, divalent or polyvalent aromatic or aliphatic alcohols, polyols, styrene, etc.), to produce a moulded body on the basis of an epoxy resin, an unsaturated polyester resin or a polyurethane resin.

In order to increase the viscosity of the casting compound, the binder component can comprise a proportion of prepolymerised polymethylacrylate, polymethylmethacrylate, polyether, unsaturated polyester or polyurethane.

As further inorganic fillers, apart from the aluminosilicate, if necessary, the materials known from the prior art can be used, in particular quartz (e.g. quartz sand), cristobalite, tridymite, glass, aluminium trihydroxide, wollastonite or mixtures thereof.

The further inorganic filler is preferably present in the form of granular particles with a mean diameter of approximately 0.1 mm to approximately 1 mm. Through the selection of the particle size, in particular also through the use of a plurality of filler fractions with different particle sizes, a visually appealing structured surface of the plastics moulded part can be obtained, in particular, the granite decoration surface mentioned in the introduction.

In order to achieve special effects, the further inorganic filler can also comprise particles in the form of fibres, whiskers or needles.

In further examples disclosed herein, the casting compound further comprises an organosiloxane functionalised with an unsaturated group. Through the addition of such organosiloxanes, the dirt-repellent effect of the surface of the plastics moulded parts can be enhanced. By this means, the cleaning of the respective kitchen and sanitary articles is facilitated.

Alternatively, or additionally, the casting compound can also comprise a particulate hydrophobic and/or oleophobic material. Examples of such materials are polytetrafluoroethylene, fluoroelastomers on the basis of vinylidene fluoride-hexafluoropropylene copolymers, polypropylene or polypropylene comonomers, silicone elastomers and hydrophobised silicic acid. Through suitable additives, the ease of cleaning of the plastics moulded parts can also be improved, and also to some extent the scratch resistance, impact strength and abrasion resistance.

The present examples disclosed further relate to the use of the casting compound according to the invention for producing kitchen or sanitary articles, in particular kitchen sinks, kitchen worktops, wash basins, bathtubs and the like.

Furthermore, the examples disclosed relate to plastics moulded parts which are produced using the casting compound according to the examples disclosed herein.

The aluminosilicate used has a composition of approximately 55% by weight of $Al_2O_3$ and approximately 43% by weight of $SiO2$ with a mean particle size (D50-value) of 30 µm, wherein the particles were coated with a methacrylsilane (Silatherm W 1360 MST; from Quarzwerke GmbH of Frechen).

The quartz sand used is a white coloured sand coated with methacrylsilane and having a particle size in the range from 0.1 to 0.6 mm at a D50 value of 330 µm (Granucol white 2/9 SIG SIL; from Dorfner Group of Hirschau).

Example 2—Production of the Plastics Moulded Parts

The homogenised and evacuated casting compound is filled into a moulding tool for a kitchen sink with a draining board and the moulding tool is heated to approximately 100° C. After approximately 20 minutes, the casting compound is cured and the plastics moulded part can be removed from the moulding tool.

Example 3—Measurement of the Impact Strength

The impact strength values in mJ/mm2 of the kitchen sinks in accordance with DIN ES ISO 179-1 are given in table 2 below (mean values from 10 measurements each):

TABLE 2

|  | Comparative example | Example 1 | Example 2 | Example 3 | Example 4 | Example 5 | Example 6 |
|---|---|---|---|---|---|---|---|
| Impact strength [mJ/mm$^2$] | 1.6 | 2.1 | 2.8 | 3.2 | 4.9 | 4.5 | 3.6 |

This and other advantages of the examples disclosed herein will now be described in greater detail based on the examples.

EXAMPLES

Example 1—Production of the Casting Compounds

Firstly, the binder components are produced in that 1 part polymethylmethacrylate (PMMA) with a molecular weight in the range of 50,000 to 250,000 g/mol is dissolved in 4 parts of methylmethacrylate (MMA). To this mixture 0.1 parts trimethylolpropane trimethylacrylate (TRIM) as a cross-linking agent and different peroxides (e.g. Peroxan BCC, Laurox and Trigonox) are added.

For the production of the casting compound according to the comparison example and examples 1 to 6, the binder component is mixed with the respective inorganic fillers and the mixture is homogenised. The respective proportions in percentage by weight are given in Table 1 below:

The results show a substantially continuous improvement in the impact toughness of the plastics moulded bodies, at least in the range between approximately 11 and approximately 56% by weight of aluminosilicate (examples 2 to 5).

Example 4—Measurement of the Thermal Durability

The resistance of the plastics moulded body to the effect of dry heat is tested with the so-called "hot pan test". Testing is carried out based upon the test regulation DIN EN 13310 wherein a test body at a temperature of 180° C. is placed in the centre of a sink under test for a period of 20 minutes.

In the case of the present kitchen sinks according to the comparative example and examples 1 to 6, the test is carried out at a test body temperature of 180° C., 280° C. and 350° C., in each case, the test body being placed in the centre of the draining board. Subsequently, colour changes, blister

TABLE 1

|  | Comparative example | Example 1 | Example 2 | Example 3 | Example 4 | Example 5 | Example 6 |
|---|---|---|---|---|---|---|---|
| Binder component | 25.500 | 25.500 | 25.500 | 25.500 | 25.500 | 25.500 | 25.500 |
| Quartz sand | 74.500 | 70.775 | 63.325 | 55.875 | 37.250 | 18.625 | — |
| Aluminosilicate | — | 3.725 | 11.175 | 18.625 | 37.250 | 55.875 | 74.500 | formation on the visible side (SS) and the rear side (RS) as well as the occurrence of glossy or matt sites are visually assessed.

The results of the hot pan test at 280° C. and 350° C. are shown in table 3 below:

TABLE 3

|  | Comparative example | Example 1 | Example 2 | Example 3 | Example 4 | Example 5 | Example 6 |
|---|---|---|---|---|---|---|---|
| Colour change at 280° C. | Slight yellow cast | — | — | — | — | — | — |
| Blister formation at 280° C. | — | — | — | — | — | — | — |
| Colour change at 350° C. | Yellow cast | — | — | — | — | — | — |
| Blister formation at 350° C. | Clearly visible and tangible on SS and RS | Clearly visible and tangible on SS and RS | Clearly visible and tangible on SS and RS | Clearly visible and tangible on SS only | Barely visible and tangible on SS | Barely visible and tangible on SS | — |
| Glossy or matt sites at 350° C. | — | — | — | — | Yes | Yes | Yes |

At a test body temperature of 180° C., relevant phenomena did not occur in any of the samples.

Example 5—Measurement of Resistance to Temperature Changes

In order to determine the resistance of the plastics moulded parts to a temperature change, they are subjected to 1,000 hot-and-cold cycles with water. The water has a temperature during the hot water phase of 90° C. (±2° C.) and flows for a duration of 90 s (±1 s) into the basin of the sink. There then follows a rest period of 30 s (±1 s). After the rest period, there follows the cold water phase at a temperature of 15° C. (±2° C.) and a duration of 90 s (±1 s). A rest period of 30 s (±1 s) follows again, before the cycle is repeated. The water flow rate during the hot water phase and during the cold water phase, respectively, amounts to 0.1 l/s (±0.01 l/s).

The visual examination of the kitchen sinks after the test reveals the following:

The surface is severely roughened in the comparative example and in examples 1 to 3. With an increasing proportion of aluminosilicate, the roughening of the surface decreases markedly until at the highest proportion of aluminosilicate (example 6), the surface is no longer roughened.

With an increasing proportion of aluminosilicate, the microcrack pattern typically occurring in products of this type and composition continuously decreases in the extent and severity of the microcracks arising. With the highest proportion of aluminosilicate (example 6), these are almost no longer discernible.

What is claimed is:

1. A curable casting compound for producing plastics moulded parts, comprising a binder component on the basis of a polymerisable monomer and a proportion of approximately 40% to approximately 85% by weight of one or more inorganic fillers, wherein the casting compound comprises an aluminosilicate as one of the inorganic fillers, and wherein the aluminosilicate has a stoichiometric composition in which the total of the proportions of $Al_2O_3$ and $SiO_2$ is approximately 98% by weight or more.

2. The casting compound according to claim 1, wherein the casting compound comprises approximately 3% to approximately 85% by weight of the aluminosilicate.

3. The casting compound according to claim 2, wherein the casting compound comprises from approximately 10% to approximately 60% by weight of the aluminosilicate.

4. The casting compound according to claim 1, wherein the aluminosilicate has a mean particle size ($D_{50}$-value) in the range of approximately 5 μm to approximately 40 μm.

5. The casting compound according to claim 1, wherein the aluminosilicate is present in the form of particles that are coated with a reactive component.

6. A curable casting compound for producing plastics moulded parts, comprising a binder component on the basis of a polymerisable monomer and a proportion of approximately 40% to approximately 85% by weight of one or more inorganic fillers, wherein the casting compound comprises an aluminosilicate as one of the inorganic fillers, and wherein the aluminosilicate has a specific surface area (BET value) from approximately 0.2 $m^2/g$ to approximately 3 $m^2/g$.

7. The casting compound according to claim 1, wherein the binder component comprises methylacrylate, methylmethacrylate, an epoxide, an unsaturated dicarboxylic acid or its anhydride, or a diisocyanate as a monomer.

8. The casting compound according to claim 7, wherein the binder component comprises a proportion of pre-polymerised polymethyl-acrylate, polymethylmethacrylate, polyether, unsaturated polyester or polyurethane.

9. The casting compound according to claim 1, comprising a further inorganic filler that is selected from quartz, cristobalite, tridymite, glass, aluminium trihydroxide, wollastonite or mixtures thereof.

10. The casting compound according to claim 9, wherein the further inorganic filler is present in the form of granular particles with a mean diameter of approximately 0.1 mm to approximately 1 mm.

11. The casting compound according to claim 9, wherein the further inorganic filler comprises particles in the form of fibres, whiskers or needles.

12. The casting compound according to claim 1, wherein the casting compound further comprises an organosiloxane functionalised with an unsaturated group.

13. The casting compound according to claim 1, wherein the casting compound further comprises a particulate hydrophobic and/or oleophobic material.

14. A plastics moulded part produced from the casting compound according to claim 1.

15. The plastics moulded part according to claim 14, which is a kitchen or sanitary article selected from kitchen sinks, kitchen worktops, wash basins, bathtubs and the like.

16. A curable casting compound for producing plastics moulded parts, comprising a binder component on the basis of a polymerisable monomer and a proportion of approximately 40% to approximately 85% by weight of one or more inorganic fillers, wherein the casting compound comprises an aluminosilicate as one of the inorganic fillers, and wherein the aluminosilicate has a stoichiometric composition which corresponds to a proportion of approximately 50% to approximately 99% by weight of $Al_2O_3$ and a proportion of approximately 1% to approximately 50% by weight of $SiO_2$.

17. A plastics moulded part produced from the casting compound according to claim 6.

18. A plastics moulded part produced from the casting compound according to claim 16.

* * * * *